(12) United States Patent
Sugiura et al.

(10) Patent No.: US 6,678,134 B2
(45) Date of Patent: Jan. 13, 2004

(54) DIGITAL PROTECTIVE RELAY SYSTEM

(75) Inventors: Hideaki Sugiura, Tokyo (JP); Itsuo Shuto, Tokyo (JP); Hachidai Ito, Tokyo (JP); Masamichi Saga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 09/971,060

(22) Filed: Oct. 5, 2001

(65) Prior Publication Data

US 2002/0057544 A1 May 16, 2002

(30) Foreign Application Priority Data

Oct. 6, 2000 (JP) ........................................ 2000-307227

(51) Int. Cl.$^7$ ................................................. H02H 3/00
(52) U.S. Cl. ............................ 361/68; 324/617; 361/62
(58) Field of Search .............................. 361/68, 66.81, 361/62; 324/418, 424, 617, 535

(56) References Cited

U.S. PATENT DOCUMENTS

| | | | |
|---|---|---|---|
| 4,470,093 A | | 9/1984 | Yamaura ...................... 361/68 |
| 4,612,594 A | | 9/1986 | Yamaura et al. ............... 361/68 |
| 5,508,619 A | * | 4/1996 | Ozawa et al. ................. 324/535 |
| 5,576,625 A | * | 11/1996 | Sukegawa et al. ........... 324/424 |
| 5,666,060 A | * | 9/1997 | Sukegawa et al. .......... 324/617 |
| 5,786,699 A | * | 7/1998 | Sukegawa et al. .......... 324/617 |

* cited by examiner

Primary Examiner—Gregory J. Toatley, Jr.
Assistant Examiner—Boris Benenson
(74) Attorney, Agent, or Firm—Foley & Lardner

(57) ABSTRACT

A digital protective relay system is capable of making sampling timing the same among plural protective relay device which operate independent from each other by using a signal from a GPS satellite. The sampling timing is made the same regardless of the time lag from which it is sent downstream with the concomitant transmission delay time in the case of data communications, or regardless of the time lag from which it is sent upstream.

10 Claims, 18 Drawing Sheets

DIGITAL PROTECTIVE RELAY SYSTEM

BACKGROUND

1. Field of the Invention

The present invention relates to a protective relay for synchronizing the sampling of electrical quantity data at a plurality of terminals on an electric power system by using a Global Positioning System, referred to as GPS.

2. Description of the Related Art

A protective relay system is known in which electrical quantity data, such as electric current, is sampled at a plurality of positions or terminals in an electric power system, such as a power transmission system. Electrical quantity data in digital form obtained by the sampling is exchanged between the terminals and used for calculation for the purpose of providing a protective function for the electrical power system.

In such a system, the sampling at the respective terminals must be synchronized, whereby the time at which the electrical quantity data is sampled at the respective terminals must be made to coincide accurately. This ensures that electrical quantity data obtained by synchronous sampling (that is, simultaneous sampling) is used for the calculation.

There have been proposed various methods for synchronizing the sampling. For example, U.S. Pat No. 4,612,594 issued Sep. 16, 1986 and U.S. Pat No. 4,470,093 issued Sep. 4, 1984, disclose synchronous sampling.

FIG. 1A is time chart illustrating the exchange of synchronous signals between a main terminal SS1 (master terminal) and a secondary terminal SS2 (servant terminal) opposite to each other across a transmission line. That is, a sampling with a sampling frequency T is operated between terminals, and a sampling time deviation $\Delta T$ exists.

First, the terminal SS2 transmits a synchronous signal F0 (sampling synchronized flag) to the terminal SS1 with the electrical quantity data.

On the other hand, the terminal SS1 measures the receiving timing Tm of the data having the synchronous signal F0 as transmitted from the terminal SS2 based on the sampling timing at the terminal SS1. The terminal SS1 transmits the receiving timing Tm and a synchronous signal F1 to the terminal SS2.

Next, the terminal SS2 also measures the receiving timing Ts of the data having the synchronous signal F1 as transmitted from the terminal SS1 based on the sampling timing at the terminal SS2.

Here, it is assumed that the transmission delay time Td from the terminal SS2 to the terminal SS1 and the transmission delay time Td from the terminal SS1 to the terminal SS2 is equal. The transmission delay time Td can be described from the following relationship as between Tm, Ts, $\Delta T$ and T.

$$Td = Tm + \Delta T + i \cdot T \quad (1)$$

$$Td = Ts - \Delta T + j \cdot T \quad (2)$$

$$2\Delta T = Ts - Tm + (j-i) \cdot T \quad (3)$$

$$\Delta T = (Ts - Tm)/2 \quad (4)$$

Where i represent an integer (i is equal to 1 in FIG. 1A), and j represents an integer (if Ts is less than Tm, j is equal to i+1, if Ts is Tm or more, j is equal to i.)

Equation (3) is derived from equation (1) and (2). In addition, under the condition that Ts is less than Tm, if (Ts+T) is approximately equal to Ts, then (j−i)·T in equation (3) may be disregarded. (j−i)·T is multiple of T. As a result, the equation (3) may be described in the manner as shown in equation (4). Accordingly, the sampling timing at each terminal becomes equal by shifting the sampling timing at the terminal SS2 so that $\Delta T$ can be set equal to a substantially zero value.

FIG. 1B is a time chart illustrating the exchange of synchronous signals between terminals SS1 and SS2. This time chart shows the sampling timing at each terminal is equal. The terminal SS2 measures the sampling frequency T0, which is the time difference between the time point in which the terminal SS2 receives the synchronous signal F0 (sampling synchronized flag) and the time point in which the terminal SS2 receives the synchronous signal F1 (sampling synchronized flag) in return.

The transmission delay time Td is calculated in accordance with the equation (5) based on T0, Ts and T.

$$Td = T0/2 - T + Ts \quad (5)$$

Accordingly, the delay time of the data transmitted from the terminal SS2 (the opposite terminal) to the sampling timing at the terminal SS1 can be determined.

As mentioned above, by exchanging between terminals the synchronized data, such as electrical data, and the sampling synchronized flag, a protective relay calculation can be made at each terminal by using the sampling data obtained from the same sampling.

The above sampling synchronizing method requires the addition of data for synchronizing into the transmitted data. Therefore, a first disadvantage of this method is that the transmission delay time to both directions on the transmission lines need to be same for establishing synchronous control between terminals.

Furthermore, a second disadvantage of this method as above mentioned is that the rate of operation lowers because the loss of synchronism happens in response to the fluctuation of the transmission delay time even if the downstream and the upstream transmission delay time on the transmission lines are same.

SUMMARY OF THE INVENTION

The present invention has been made in view of the above-mentioned circumstances and is intended to solve the above-mentioned problems.

In particular, the object of the present invention is to provide a digital protective relay system in an electric power system, having two or more terminals being coupled to form a pair, and protective relay devices provided at each of the terminals. The system includes receiving sections that respectively are connected to the protective relay device, each receiving section receiving an electric wave from a satellite and outputting a fixed cycle pulse. The system also includes clock signal generating sections that respectively are set in each protective relay device, each clock signal generating sections generating a clock signal. The system further includes sampling pulse generating sections that respectively are set in each protective relay device, each sampling pulse generating section generating a sampling pulse with a fixed frequency in accordance with the clock signal. The system still further includes timing difference measurement sections that respectively are set in each protective relay device, each timing difference measurement section measuring a timing difference of the fixed cycle pulse and the sampling pulse. The system also includes correcting sections that respectively are set in each protective relay device, each correcting section correct a frequency of the sampling pulse from each sampling pulse generating section in accordance with the timing difference. The system further includes digital converting sections that respectively are set in each protective relay device, each digital converting section generating an electrical quantity data in digital form by sampling an electrical quantity of the electric power system in accordance with the sampling pulse of each sampling pulse generating section. The system still further includes transmitting sections that respectively are set in each protective relay device, each transmitting section transmitting and receiving the electrical quantity data between each protective relay device. The system also includes calculating sections that respectively are set in each protective relay device, each calculating section performing a calculation for a protective function by using the electrical quantity data obtained at each protective relay device. The system further includes outputting sections that respectively are set in each protective relay device, each outputting section outputting the result of the calculating section at each protective relay device.

BRIEF DESCRIPTION OF DRAWINGS

The accompanying drawings, which are incorporated in and constitute a part of this specification, illustrate several preferred embodiments of the present invention and, together with the description, serve to explain the principles of the present invention.

DESCRIPTION OF PREFERRED EMBODIMENTS

Preferred embodiments of a digital protective relay system according to the present invention are now specifically described in more detail with reference to the accompanying drawings.

Wherever possible, the same reference numbers are used throughout the drawings to refer to the same or like parts.

(First embodiment)

Figure 1A:
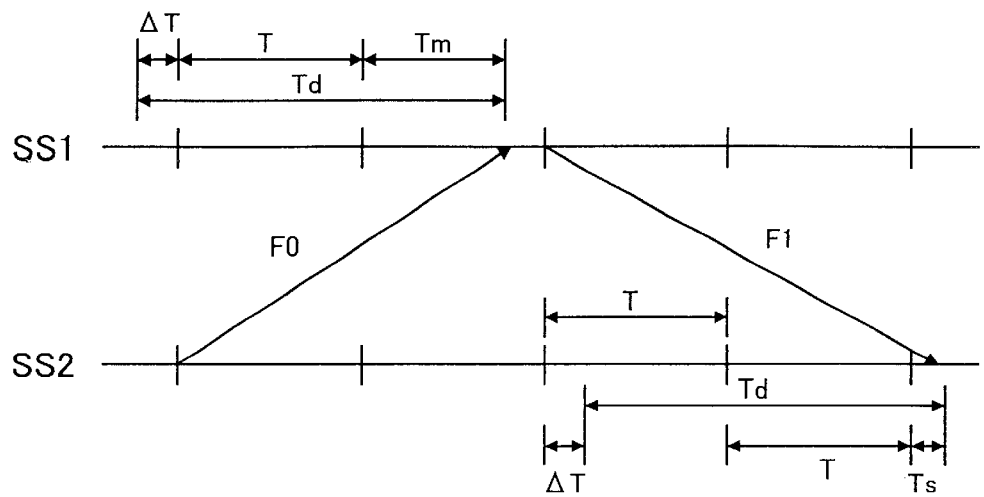
FIG. 1A and FIG. 1B are time charts illustrating the exchange of the synchronous signals between terminals.
Figure 1B:
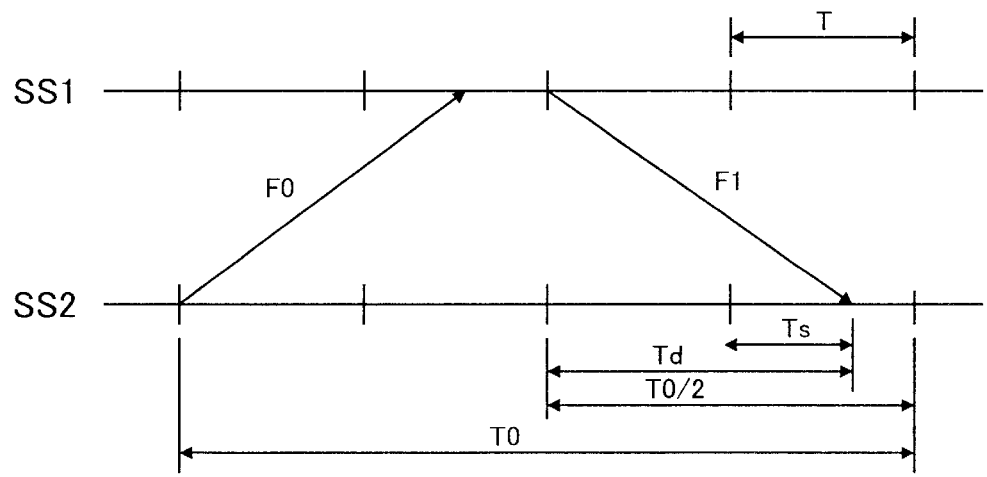
Figure 2:
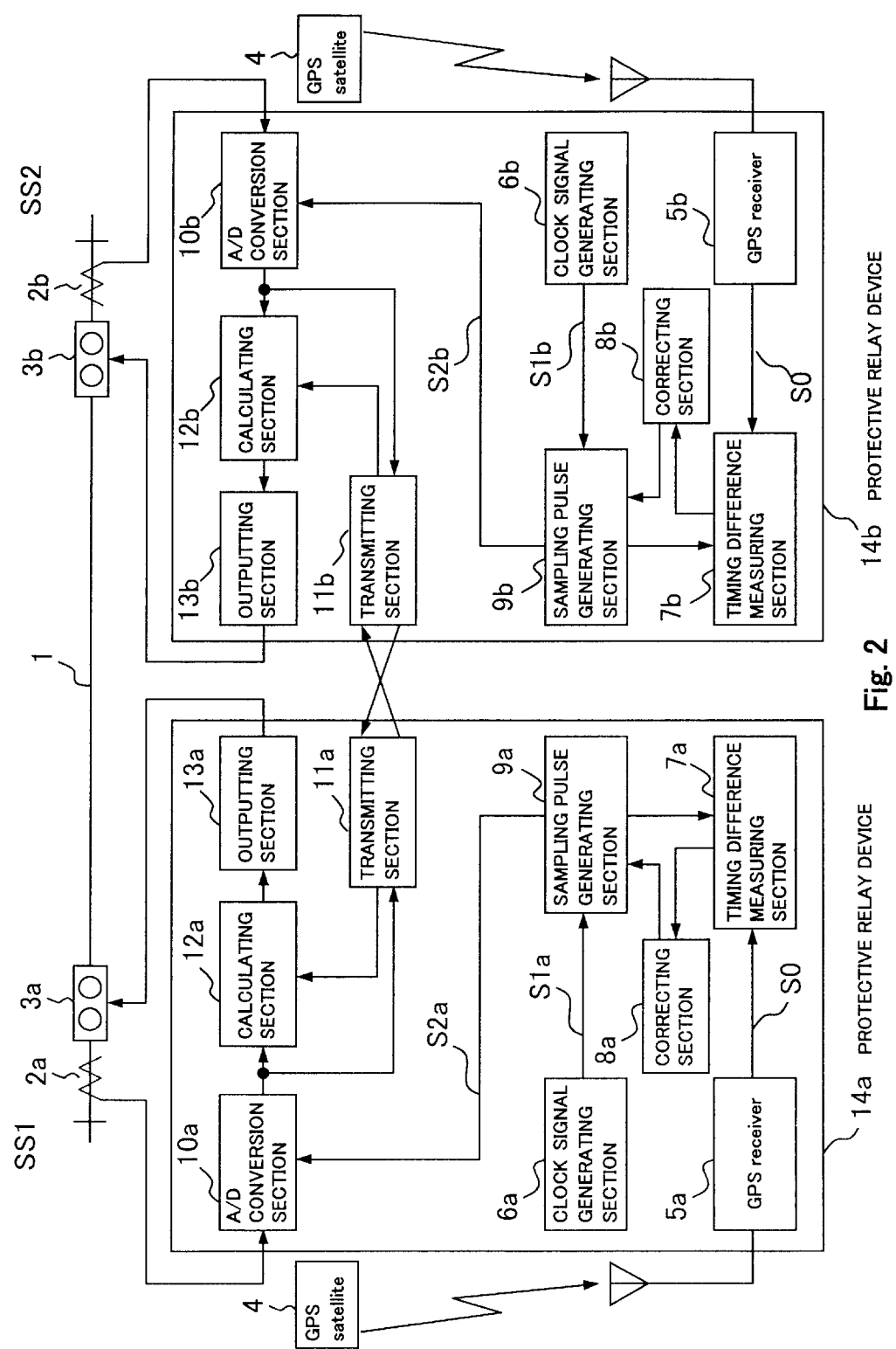
FIG. 2 is a diagram showing a first embodiment in accordance with the present invention.

FIG. 2 shows the diagram showing a first embodiment in accordance with the present invention.

There is shown a protective relay system protecting a transmission line 1 through a pair of protective relay devices (a protective relay device 14a and 14b), which is provided at a terminal SS1 and a terminal SS2 opposite to each other across the transmission line 1. Provided at the respective terminals are current transformers 2a and 2b for detecting the current through the transmission line 1 and for adjusting the detected current for the protective relay device 14a and 14b, and circuit breakers 3a and 3b that are operative responsive to the protective relay device 14a and 14b.

The protective relay device 14a and 14b respectively receive the currents from current transformer 2a and 2b, and periodically sample the currents and digitize them to obtain current data through A/D conversion sections 10a and 10b.

The obtained electrical quantity data which is exchanged through a transmitting section 11a and 11b is used for a protective function calculation in a calculating section 12a and 12b. When a result of the calculation is that the transmission line 1 is found to be in a state requiring disconnection, outputting sections 13a and 13b output trip signals to cause the tripping of the circuit breaker 3a and 3b.

Here, in order to provide a proper calculation for protective function at the protective relay device 14a and 14b, the time at which the electrical quantity data is sampled at the respective device 14a and 14b must be made to coincide accurately.

A GPS (Global Positioning System) receiver 5a and 5b outputs a fixed cycle pulse S0 at the same timing, received from a GPS satellite 4. On the other hand, clock signal generating sections 6a and 6b outputs clock signals S1a and S1b, respectively. These clock signals S1a and S1b are asynchronous.

In addition, the GPS system converts a time counted by an atomic clock (comprising an ultraprecise oscillator formed of cesium or rubidium), mounted on a satellite, to a time signal and transmits the signal from the satellite to a receiver station on the ground. A transmission time during which the signal is transmitted is measured on the basis of the difference between the time represented by the time signal received by the receiver station and the time when the signal is actually received.

Timing difference measuring section 7a measures the timing difference of the fixed cycle pulse S0 and a sampling pulse S2a. Sampling pulse S2A is output by sampling pulse generating section 9a. Similarly, a timing difference measuring sections 7b measures the timing difference of the fixed cycle pulse S0 and a sampling pulse S2b. Sampling pulse S2B is output by sampling pulse generating section 9b. A correcting section 8a and 8b respectively correct the frequency of sampling pulse S2a and S2b so that the timing difference measured through timing difference measuring sections 7a and 7b is substantially zero.

Consequently, in protective relay devices 14a and 14b which are the devices which are mutually independent, since asynchronous sampling pulse S2a and S2b serve as the same timing on the basis of the fixed cycle pulse S0, the synchronization between terminals is established.

Figure 3:
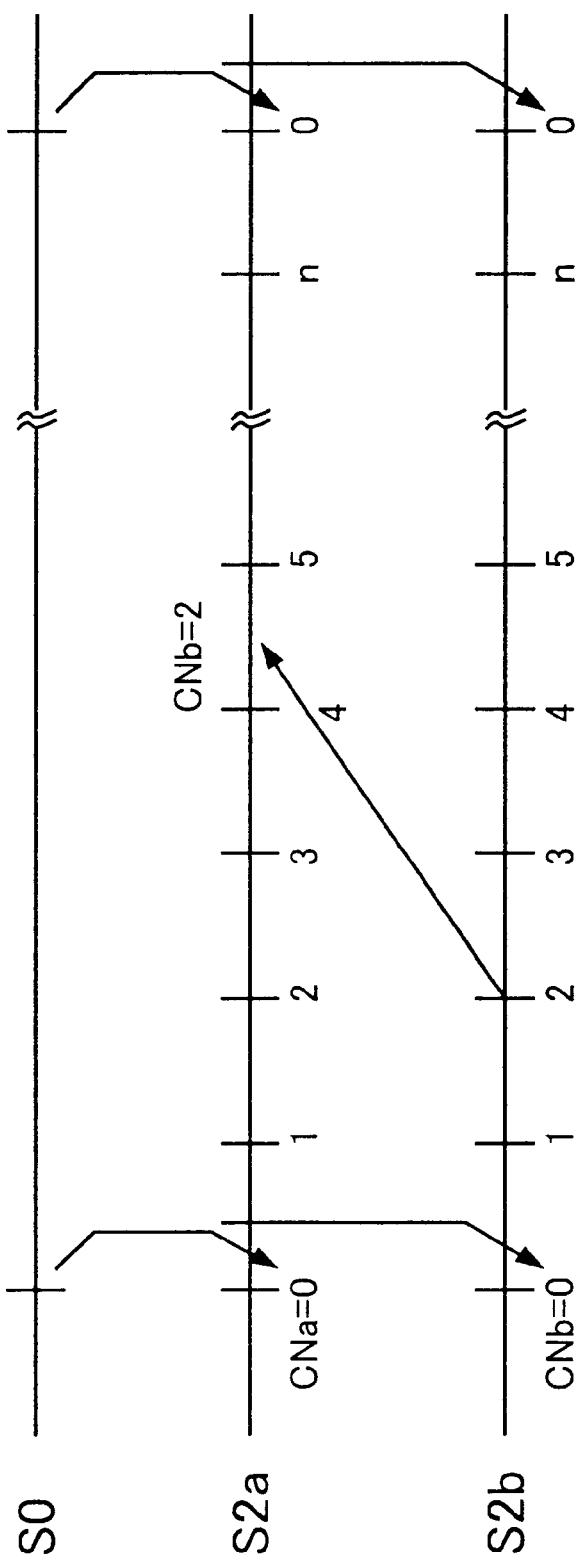
FIG. 3 is a time chart illustrating a principle of synchronization.

Next, the principle of calculation with the electrical quantity data sampled at the same time is explained referring to FIG. 3. Where the synchronization between the protective relay device 14a and 14b is established by the above-mentioned method, each device 14a and 14b can give the same counter value to the sampling data of the same time, if the counters CNa and CNb updated every sampling pulse S2a and S2b with the time as the starting point of the input of the fixed cycle pulse S0 are formed.

Therefore, when this counter value is transmitted with the electrical quantity data from an opposite terminal, a reception terminal reads this counter value. Namely, the electrical quantity data having the same counter value can be used for calculation for the purpose of the protective function. In addition, if the transmission delay time between the protective relay device 14a and 14b is less than a sampling cycle, it is not necessary to provide the above-mentioned counter.

As described above, according to the first embodiment, since a sampling pulse is synchronized with a signal from a GPS satellite, regardless of the time lag from which it is sent downstream with the concomitant transmission delay time in the case of data communications, or regardless of the time lag from which it is sent upstream, sampling timing can be made the same among plural protective relay device which operate independent from each other.

(Second embodiment)

Figure 4:
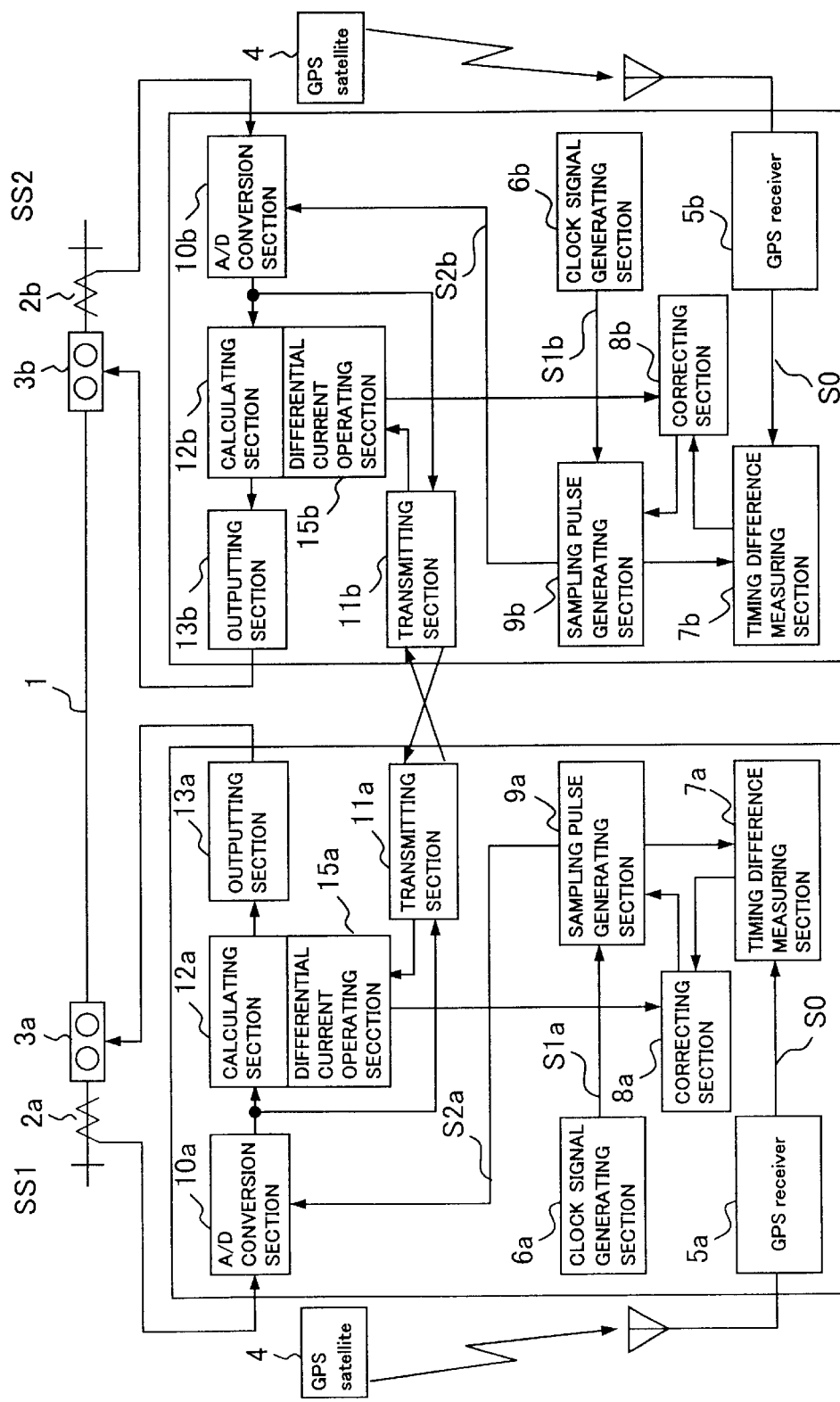
FIG. 4 is a diagram showing a second embodiment in accordance with the present invention.

FIG. 4 is a block diagram showing a second embodiment in accordance with the present invention.

In FIG. 4, the same elements as shown in FIG. 2 are identified with the same reference numerals as used in FIG. 2, and explanation is omitted for the sake of brevity. The difference between the first embodiment and this embodiment is the addition of a differential current operating sections 15a and 15b.

With the first embodiment, if the timing signals normally output from the GPS satellite 4 are not output for some reason, with the result that the fixed cycle pulse S0 from the GPS receivers 5a and 5b will not be output, the timing difference measuring section 7a and 7b and the correcting section 8a and 8b will not function properly or at all. Therefore, the synchronization will slip gradually by virtue of the deviation between clock signals from the clock signal generating section 6a and 6b.

This embodiment is based on the principle that the vector sum of the current at both ends and the so-called differential current become equal to zero, when the synchronization between the protective relay device 14a and 14b is established in the state where there is no fault in a transmission line 1. By way of explanation, the protective relay device 14a is used as a main terminal, and the protective relay device 14b as a secondary terminal. When the GPS satellite 4 does not output timing signals due to some malfunction, for example, or when the fixed cycle pulse S0 is not output from the GPS receivers 5a and 5b, once the synchronization between terminals is established, frequency of the clock signal S1b is corrected through the correcting section 8b of the protective relay device 14b so that the differential current for which it obtained with the differential current operating section 15a and 15b may be set to approximately 0.

Thereby, the sampling pulse S2b of the protective relay device 14b can follow the sampling pulse S2a of the protective relay device 14a, and can continue the synchronous establishment state between terminals.

In addition, for example, by existence of a branch load with which the protective relay device is not provided, when a certain amount of the differential current has always occurred in the past, the ordinary difference current value calculated with the differential current operating section 15a and 15b is stored. When the GPS satellite 4 does not output timing signals, or when the fixed cycle pulse S0 is not output from the GPS receivers 5a and 5b, the differential current operating section controls the sampling pulse width according to the difference of the differential current value and the present differential current value with which it had stored before the GPS receivers 5a and 5b stop outputting S0. The difference is used to correct the frequency of the clock signal S1b through the correcting section 8b so that the differential current value to which the present difference current value is recorded may be approximated.

As described above, according to the second embodiment, when the GPS satellite does not output timing signals, or when the fixed cycle pulse from the above-mentioned GPS receiver is not outputted, the sampling pulse, which was synchronized between terminals, can be continued and outputted.

(Third embodiment)

Figure 5:
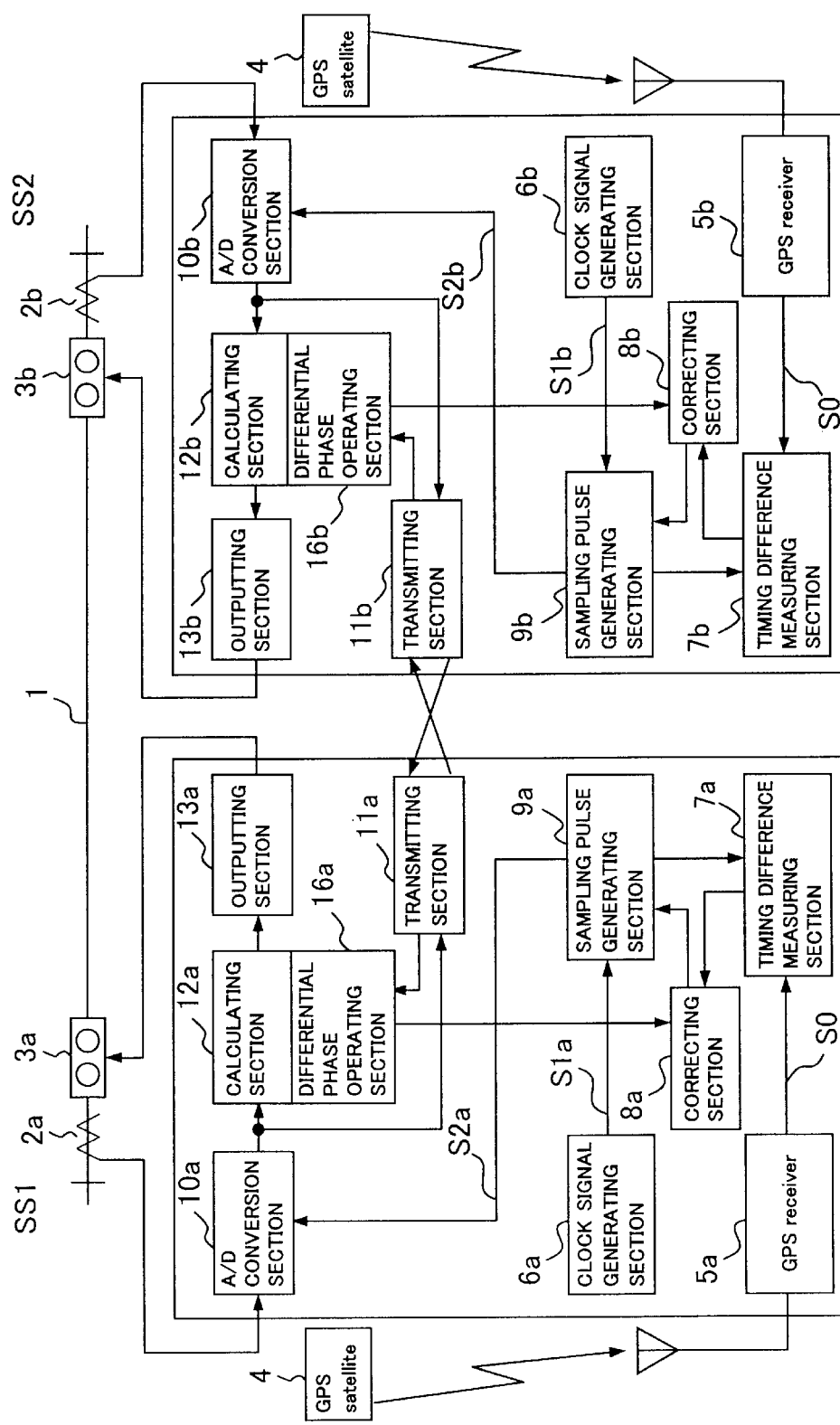
FIG. 5 is a diagram showing a third embodiment in accordance with the present invention.

FIG. 5 is a block diagram of a third embodiment in accordance with the present invention.

In FIG. 5, the same elements as shown in FIG. 2 are identified with the same reference numerals as used in FIG. 2, and explanation is omitted for the sake of brevity. The difference between the first embodiment and this embodiment is the addition of the differential phase operating sections 16a and 16b.

With this embodiment, when the synchronization between terminals is established in the state where there is no fault in a power line 1, it operates under the principle that the phase difference of the current at both terminals serves as zero. In more detail, the protective relay device 14a is used as a main terminal, and the protective relay device 14b as a secondary terminal. When the GPS satellite 4 does not output timing signals, or when the fixed cycle pulse S0 is not output from a GPS receivers 5a and 5b, whereby the synchronization between terminals had been previously established, the frequency of the clock signal S1b is corrected through the correcting section 8b so that the phase difference of the current for which it obtained with a differential phase operating sections 16a and 16b may serve as approximately equal to 0.

Thereby, the sampling pulse S2b of the protective relay device 14b can follow the sampling pulse S2a of the protective relay device 14a, and can continue the synchronous establishment state between terminals.

In addition, as well as the above-mentioned features, when a certain amount of phase difference has always occurred in the past according to the state of a system, the ordinary phase difference for which it already obtained with the differential phase operating sections 16a and 16b is stored. When the GPS satellite 4 does not output timing signals, or when the fixed cycle pulse S0 is not output from the GPS receivers 5a and 5b, the frequency of the clock signal S1b through the correcting sections 8b may be corrected so that it may become set to value close to the already stored phase difference.

Furthermore, when power flow is not flowing across the transmission line according to the state of the electric power system, the phase difference of current cannot be calculated. Therefore, when the current is less than a predetermined value, synchronization is not based on the phase difference of current, but rather the phase difference of voltage may be made to maintain synchronization. In addition, since phase difference has always occurred in the past in this case, correction will be performed so that it may become set to a value approximately equal to the ordinary phase difference.

As mentioned above, according to the third embodiment, when the GPS satellite does not output timing signals, or when the fixed cycle pulse from the GPS receiver is not outputted, the sampling pulse, which may be synchronized between terminals, can be continued and outputted.

(Fourth embodiment)

Figure 6:
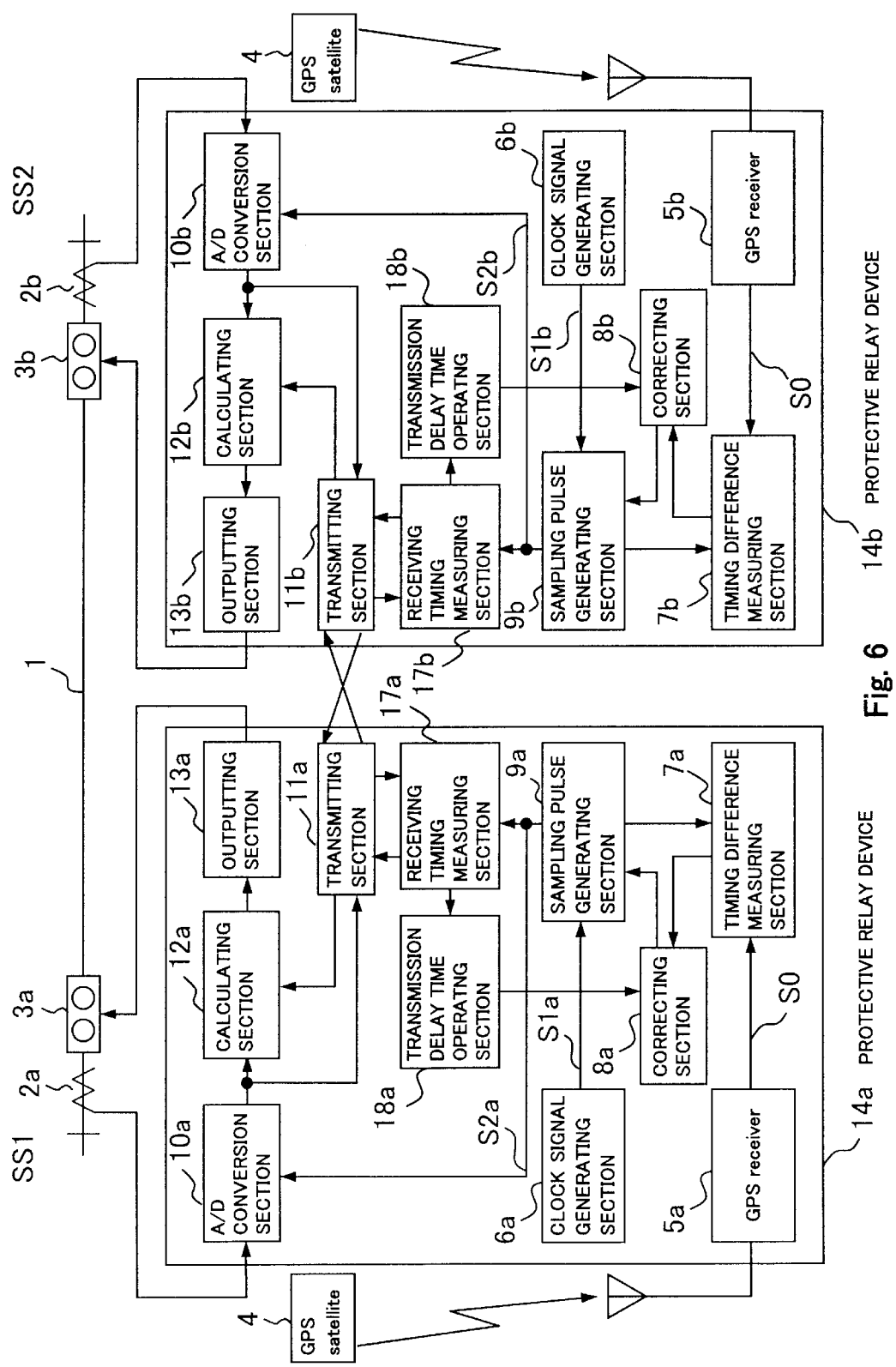
FIG. 6 is a diagram showing a fourth embodiment in accordance with the present invention.

FIG. 6 is a block diagram of a fourth embodiment in accordance with the present invention.

In FIG. 6, the same elements as shown in FIG. 2 are identified with the same reference numerals as used in FIG. 2, and explanation is omitted for the sake of brevity. The difference between the first embodiment and this embodiment is the addition of receiving timing measuring sections 17a and 17b and a transmission delay time operating sections 18a and 18b between terminals.

With this embodiment, on the conditions that the upstream and downstream transmission delay times are equal, when the GPS satellite 4 does not output timing signals, or when the fixed cycle pulse S0 is not outputted from GPS receivers 5a and 5b, for example, with the application of the sampling time synchronous method described on the U.S. Pat. No. 4,612,594, the receiving timing Tm and Ts is measured with the receiving timing measuring sections 17a and 17b. The transmission delay time Td is obtained by the transmission delay time operating sections 18a and 18b.

That is, when the GPS satellite 4 does not output timing signals, or when the fixed cycle pulse S0 is not outputted from the GPS receivers 5a and 5b, it switches to the sampling synchronous method by the above mentioned method, whereby the sampling pulse which may be synchronized between terminals can be continued and outputted even when the GPS system fails to output properly.

(Fifth embodiment)

Figure 7:
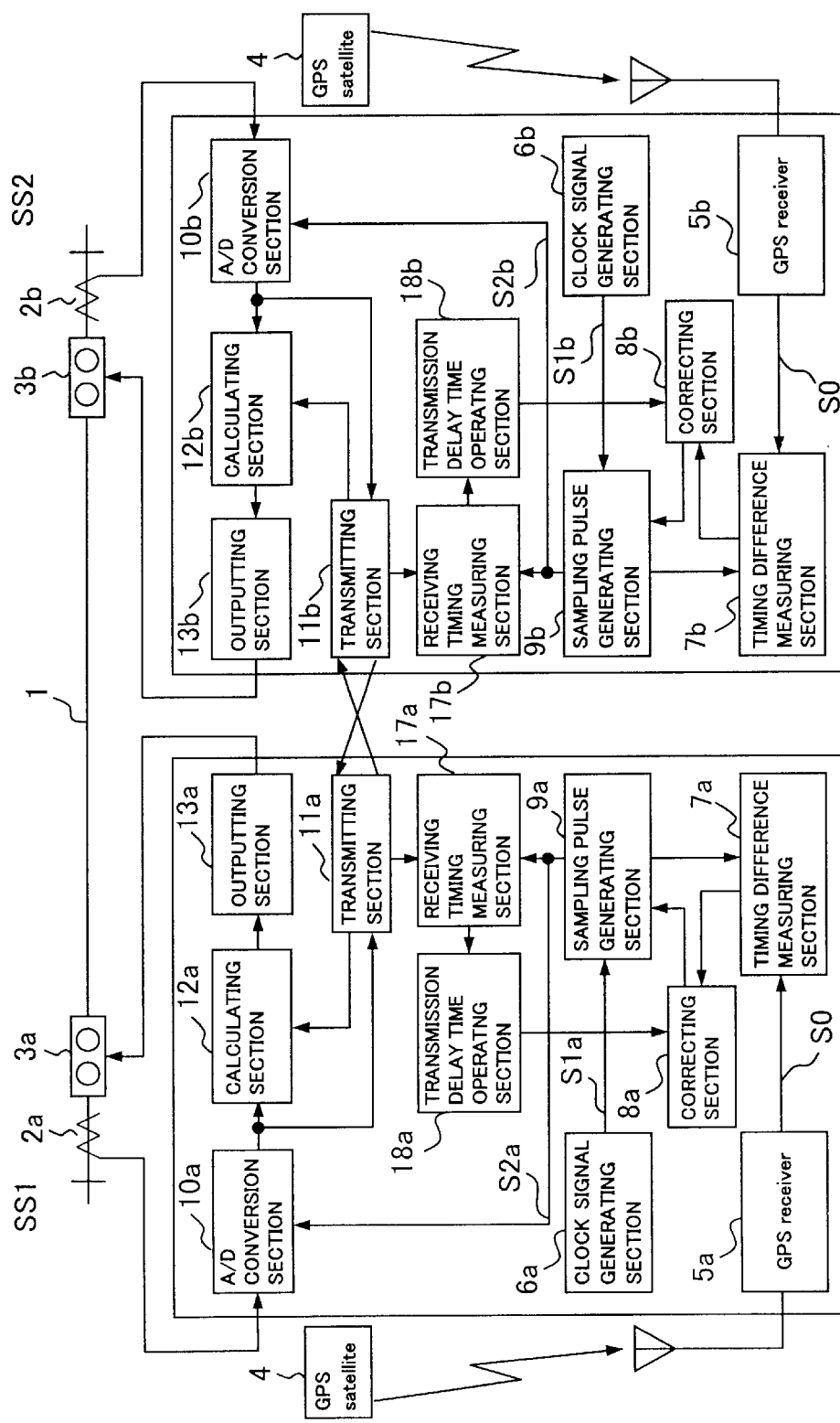
FIG. 7 is a diagram showing a fifth embodiment in accordance with the present invention.

FIG. 7 is a block diagram of a fifth embodiment in accordance with the present invention.

In FIG. 7, the same elements as shown in FIG. 2 are identified with the same reference numerals as used in FIG. 2, and explanation is omitted for the sake of brevity. The difference between the first embodiment and this embodiment is the addition of transmission signal receiving timing measuring sections 17a and 17b and transmission delay time operating sections 18a and 18b between terminals.

In more detail, a protective relay device 14a is used as a main terminal, and a protective relay device 14b as a secondary terminal. While the predetermined periodic pulse is output from a GPS receivers 5a and 5b, each device 14a and 14b calculates and records transmission delay time from the receiving timing that is measured. When the GPS satellite 4 does not output timing signals, or when the fixed cycle pulse S0 is not outputted from the GPS receivers 5a and 5b, the frequency of the clock signal S1b is corrected from the transmission delay time and the present data receiving timing which were stored, through the correcting section 8b.

Thereby, the sampling pulse S2b of the protective relay device 14b can synchronize with the sampling pulse S2a of the protective relay device 14a, and the synchronous establishment state between terminals can continue even when the GPS system temporarily fails to operate properly.

As mentioned above, according to this embodiment, when the GPS satellite does not output timing signals, or when the fixed cycle pulse is not outputted from the above-mentioned GPS receiver, the sampling pulse may still be synchronized between terminals and outputted.

(Sixth embodiment)

Next, a sixth embodiment in accordance with the present will be explained. Similar to the second embodiment to the fifth embodiment, when the GPS satellite does not output timing signals, or when the fixed cycle pulse from the above-mentioned GPS receiver is not be outputted, the sampling pulse may still be synchronized and outputted between terminals in the sampling synchronous continuation sections in the protective device 14a and 14b.

The sixth embodiment has at least two or more of the sampling synchronous continuation sections described in each previously-described embodiment, and even if it is made to correct, complementing mutually, the same effect can be acquired. For example, with the second and the third embodiment, the current which flows on the transmission line is measured and used as a means of synchronous control even when the GPS system fails. That is, although neither the differential current nor the phase difference can be calculated when current is not flowing, through the fourth and the fifth embodiment which do not use current, synchronous control can be attained even when the GPS system fails.

Moreover, with the fourth and the fifth embodiment, when the GPS satellite 4 does not output timing signals, or when the fixed cycle pulse S0 is not outputted from the GPS receivers 5a and 5b, when a difference arises in connection with an upstream and downstream transmission delay time, the change cannot be detected.

However, since the differential current or the phase difference of current occurs as a result of the change, the synchronous control described in the second and the third embodiments can be continued. Thus, combining two or more synchronous control continuation sections by which principles differ provides for a more robust system, which can operate more flexibly.

(Seventh embodiment)

Figure 8:
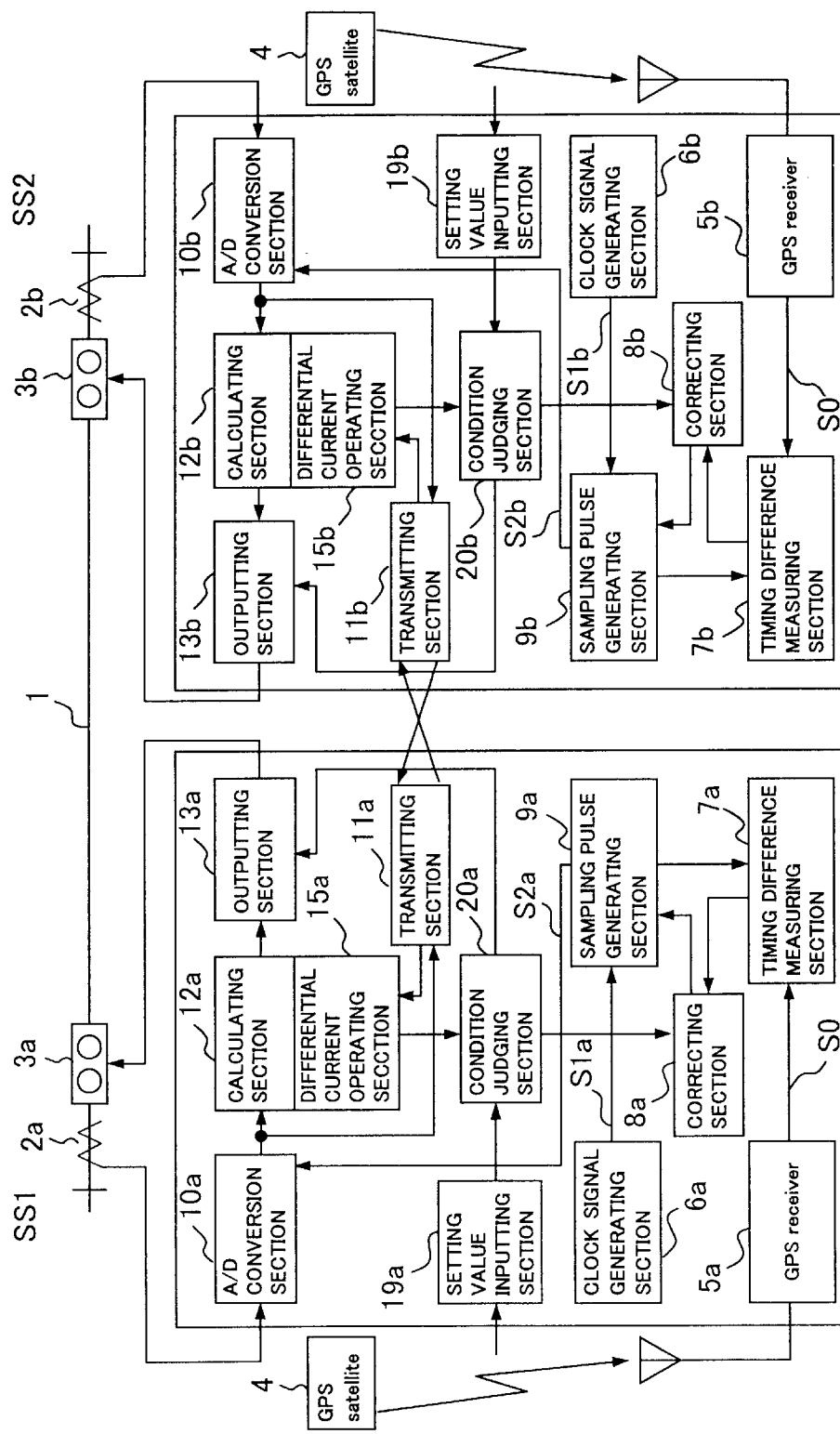
FIG. 8 is a diagram showing a seventh embodiment in accordance with the present invention.

FIG. 8 is a block diagram of a seventh embodiment in accordance with the present invention.

In FIG. 8, the same elements as shown in FIG. 2 are identified with the same reference numerals as used in FIG. 2, and explanation is omitted for the sake of brevity. The difference between the first embodiment and this embodiment is the addition of setting value input sections 19a and 19b and condition judging sections 20a and 20b.

With this embodiment, when the control state by the sampling synchronous continuation sections continues for a long period of time, a slip or deviation in synchronization gradually arises in the sampling timing according to the individual difference of the pulse signal generating sections in each device 14a and 14b. A marginal value, as a threshold value, is beforehand inputted for various elements, such as the continuation time, difference current, and change of phase difference and the data receiving timing from the opposite terminal, at the setting value inputting sections 19a and 19b, taking into consideration the case that a protective relay device may operate incorrectly over time. The condition judging sections 20a and 20b judge that the simultaneity of the sampling timing between terminals has been lost, when an element mentioned above exceeds the corresponding marginal value, and they prevent the unwanted (e.g. incorrect) output from the output sections.

According to this embodiment, in the case where the state of continuing and outputting a sampling pulse continues for a long time, when it changes into the state where differential current and phase difference may occur in response to a fault, and when receiving timing changes suddenly due to a change of transmission delay time or the like, it can prevent a synchronous slip from arising between terminals.

(Eighth embodiment)

Next, an eighth embodiment in accordance with the present will be explained. The following functions may be added to the protective relay device of each embodiment mentioned above. In the eighth embodiment, all the electrical quantity data acquired with two or more protective relay device is sampled to the same timing. Therefore, it is effective to operate to collect aforementioned amount of electrical data and to make a comparison study of the collected data and a new operation.

Figure 9:
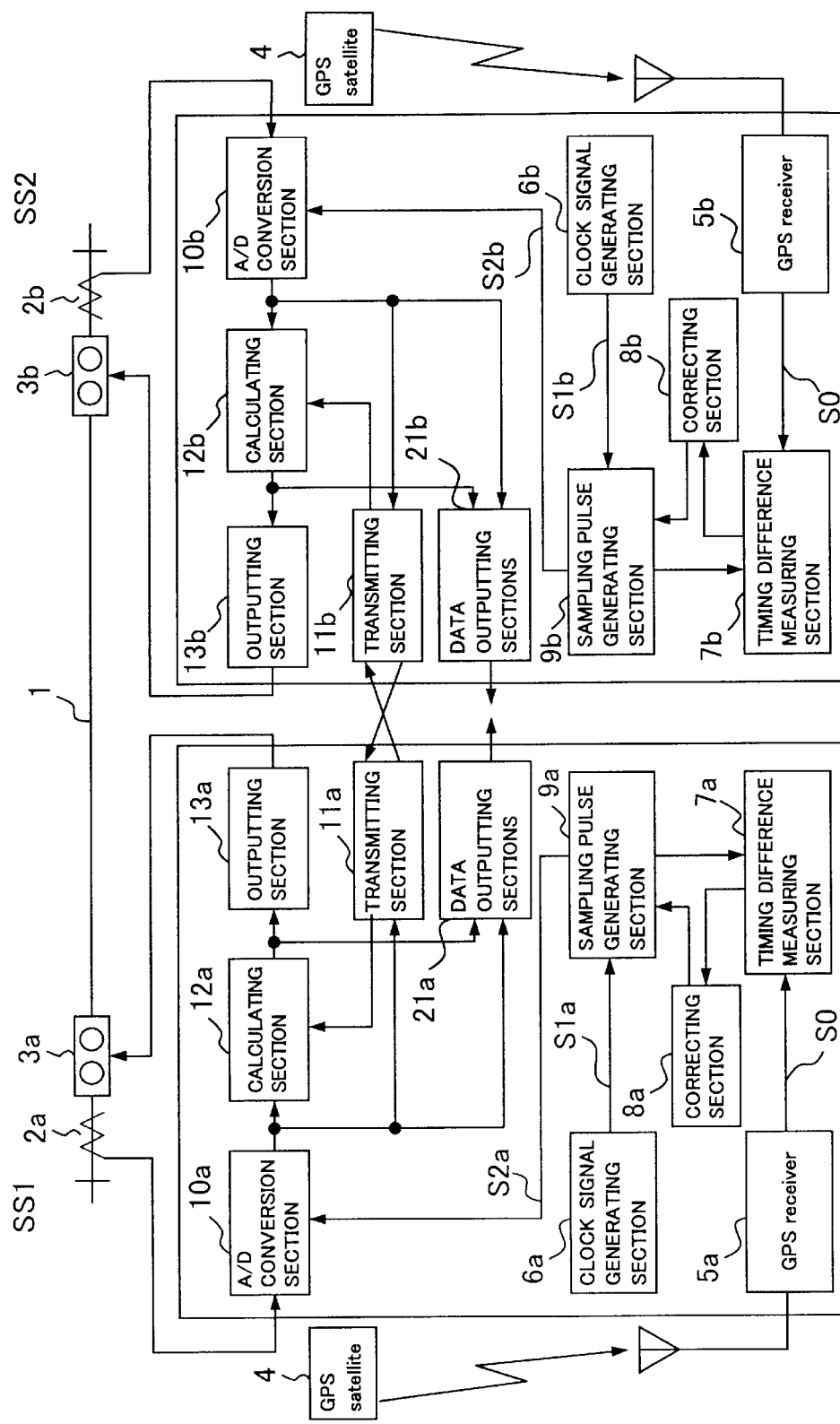
FIG. 9 is a diagram showing an eighth embodiment in accordance with the present invention.

Moreover, it is also effective to collect the operation results at the protective relay device, and to check the state of each device. Namely, secondary use of the data in another device can be enabled by establishing data output sections 21a and 21b to output the above-mentioned data to another device as shown in FIG. 9. In addition, it can be attained that data is outputted through transmitting sections 11a and 11b without using a data output sections 21a and 21b.

(Ninth embodiment)

Next, a ninth embodiment in accordance with the present will be explained. The previously-described embodiments have been described as applied to a situation where a transmission line having two terminals is protected as a zone of protection, but is of course applicable to a situation where the transmission line having three or more terminals is protected as a zone of protection, such as where a bus and a transformer in a substation is protected as a zone of protection. Furthermore, this embodiment can be applicable to the protection of the various system as well as the above-mentioned.

(Tenth embodiment)

Figure 10B:
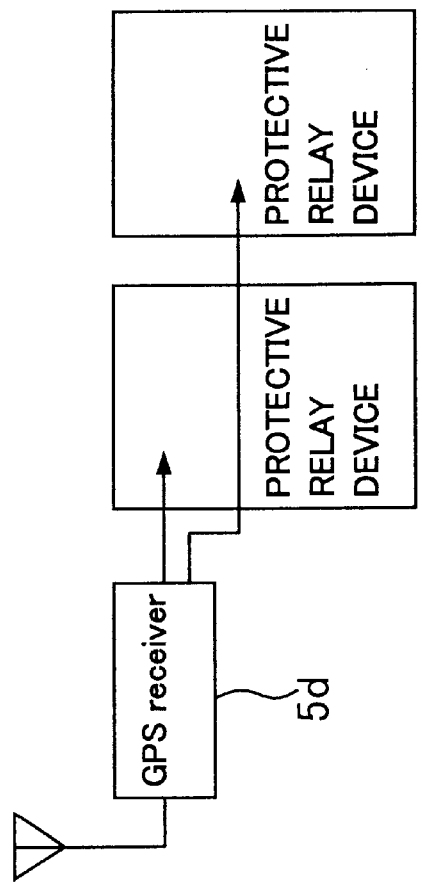
FIGS. 10A and 10B are diagrams showing a tenth embodiment in accordance with the present invention.
Figure 10A:
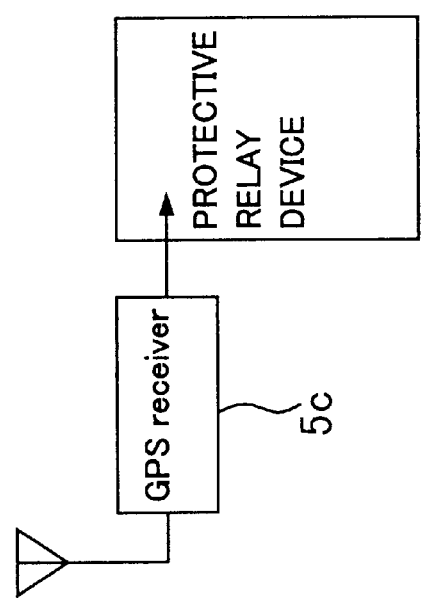

Moreover, as shown in FIG. 10A, a GPS receiver 5c separate from the protective relay device is provided in a different composition. Also, in FIG. 10B, the fixed cycle pulse S0 provided to two or more protective relay device from a same GPS receiver 5d can be applicable to each embodiment mentioned above.

(Eleventh embodiment)

Figure 11:
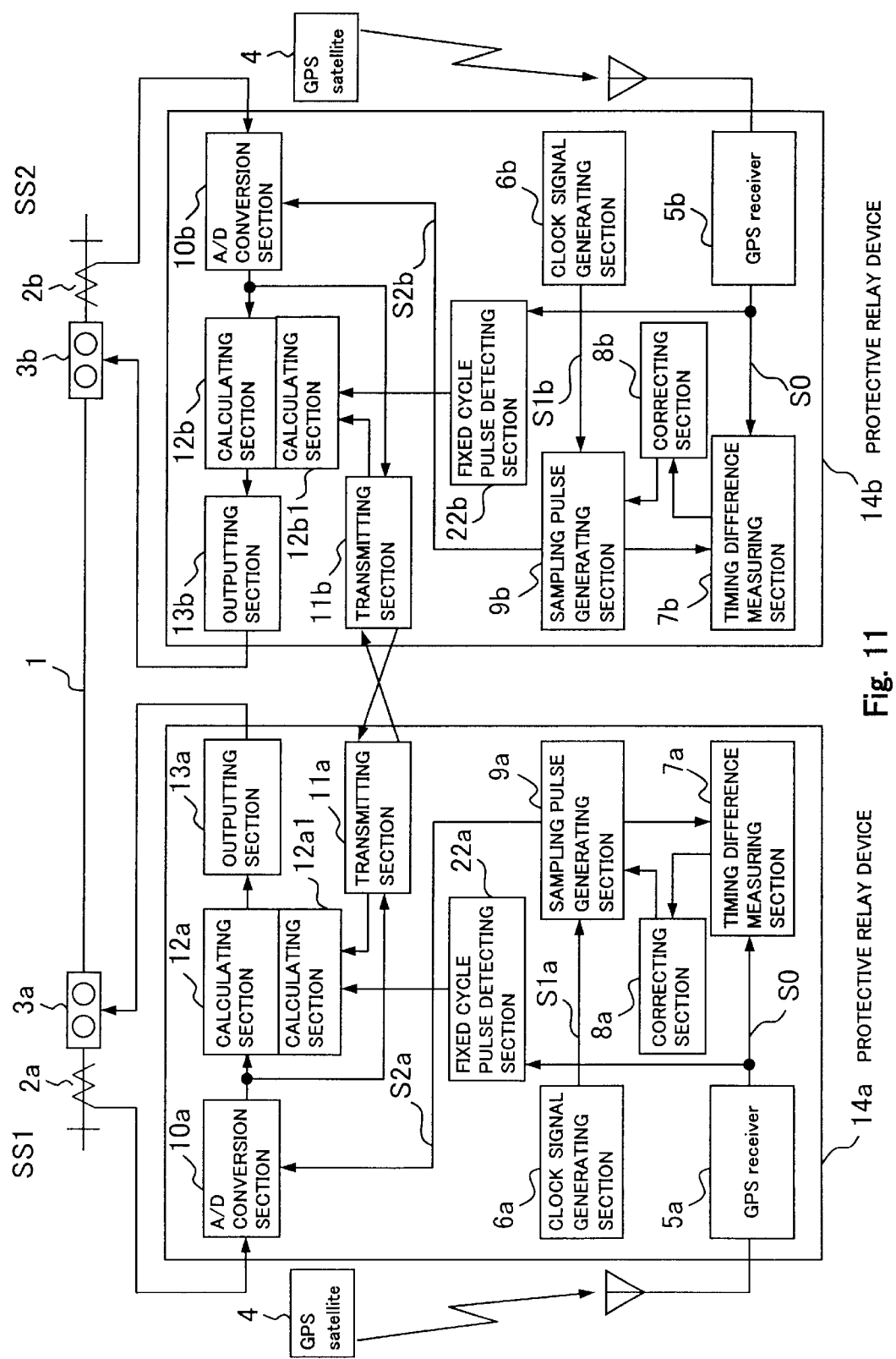
FIG. 11 is a diagram showing an eleventh embodiment in accordance with the present invention.

FIG. 11 is a block diagram of an eleventh embodiment in accordance with the present invention.

In FIG. 11, the same elements as shown in FIG. 2 are identified with the same reference numerals as used in FIG. 2, and explanation is omitted for the sake of brevity. The difference between the first embodiment and this embodiment is the addition of operating sections 12a1 and 12b2 and fixed cycle pulse detecting sections 22a and 22b. With this embodiment, the state of the fixed cycle pulse S0 output from the GPS receivers 5a and 5b is monitored. As a result of this monitoring, if it is determined that the output is abnormal or is not being outputted, operating sections 12a 12b will be switched to operating sections 12a1 and 12b1 having a sensitivity operating characteristic lower than those of the operating sections 12a and 12b.

Figure 12:
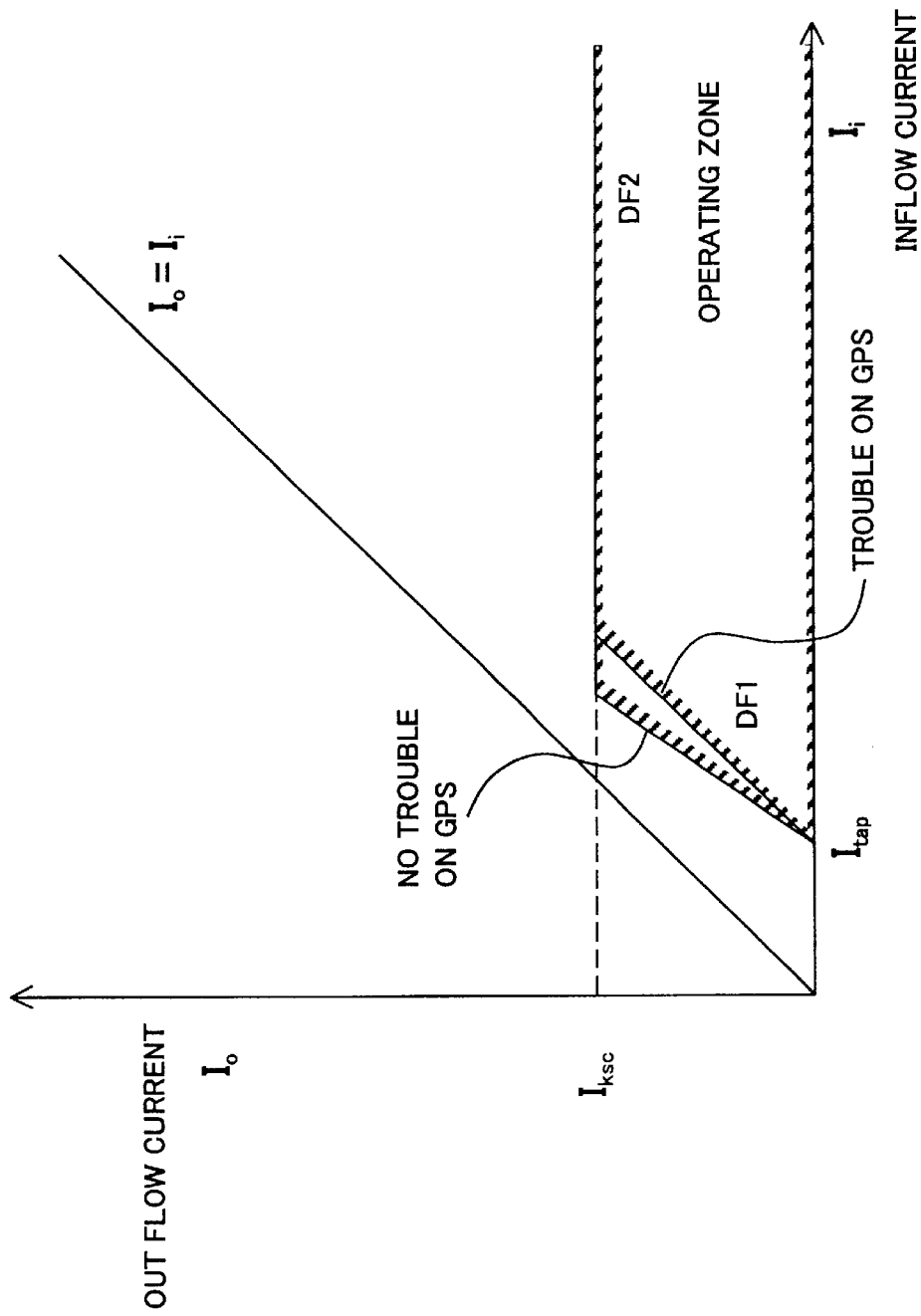
FIG. 12 is a graphic chart showing a twelfth embodiment in accordance with the present invention.

FIG. 12 shows the operating characteristic of the operating sections 12a and 12b and the operating sections 12a1 and 12b1. The horizontal axis signifies inflow current Ii and the vertical axis signifies outflow current Io. When the error of the current differential operation by the sampling synchronous error becomes so large that current is large, the ratio characteristic is made to have a low sensitivity.

Here, Itap signifies the minimum sensitivity determined from the minimum fault current. Iksc signifies the maximum outflow current, from which it is determined that an un-wanted operation corresponds to the zone above this, for preventing unwanted operation by current saturation on current transformers 2a and 2b.

DF1: $I0 \leq (5/7) \cdot (Ii - Itap)$

DF2: $I0 \leq Iksc$ where (5/7) represents the ratio characteristic coefficient for avoiding unwanted operation by the sampling synchronous error. This ratio characteristic coefficient is determined by the communication system applied to an electric power system, and may be different from the value provided above.

When abnormalities occurs in the fixed cycle pulse S0 or when the fixed cycle pulse S0 is not outputted, the small current region characteristic DF1 is calculated by the following equation through the operating sections 12a1 and 12b1.

DF1: $I0 \leq (4/7) \cdot (Ir - Itap)$

DF2: $I0 \leq Iksc$

Here, an explanation is given for the case where the ratio characteristic coefficient is (4/7). That is, as compared with the above-mentioned equation that applied the ratio characteristic coefficient (5/7), the operating zone is narrowed by using a smaller characteristic coefficient.

Moreover, the minimum sensitivity setting value (Itap) may be changed to a different value such as (Itap×1.2), and the minimum sensitivity may be made lower as a result.

According to this embodiment, when the GPS satellite 4 does not output timing signals, an unwanted operation of the current differential relay due to an increase of the operation error of the differential current by accumulation of a synchronous error can be prevented. Thus, synchronization is maintained even when under the state in which the fixed cycle pulse S0 is not outputted for a fairly long period of time from the GPS receivers 5a and 5b.

According to this embodiment, when the GPS satellite 4 does not output timing signals, an unwanted operation of the current differential relay due to an increase of the operation error of the differential current as a result of accumulation of a synchronous error due to operation under a state which the fixed cycle pulse S0 is not outputted from the GPS receivers 5a and 5b, can be prevented.

(Twelfth embodiment)

Figure 13:
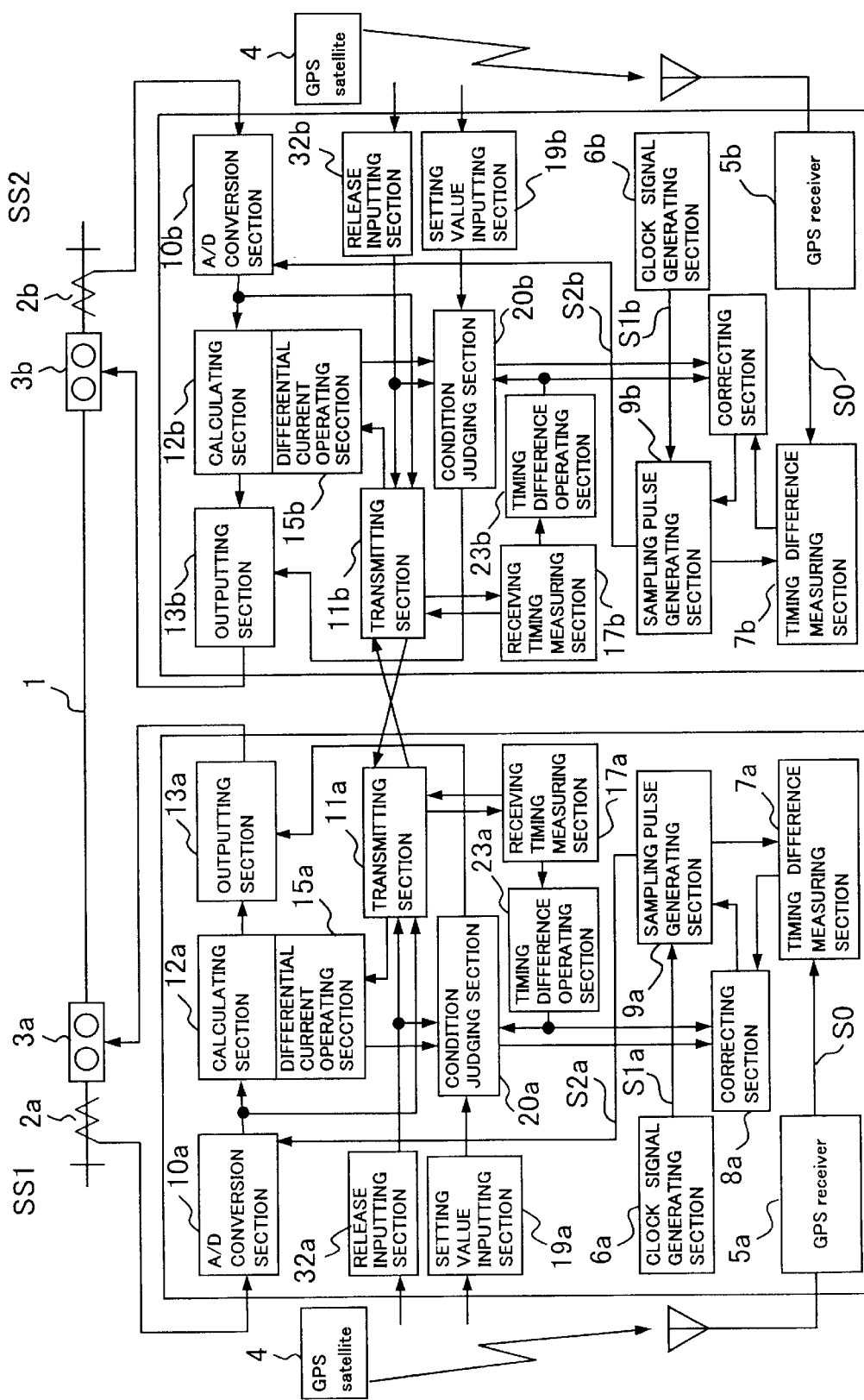
FIG. 13 is a block diagram showing a thirteenth embodiment in accordance with the present invention.

FIG. 13 is a block diagram of a twelfth embodiment in accordance with the present invention.

In FIG. 13, the same elements as shown in FIG. 9 are identified with the same reference numerals as used in FIG. 9, and explanation is omitted for the sake of brevity. The difference between this embodiment and FIG. 9 is the addition of release inputting sections 32a and 32b, receiving timing measuring sections 17a and 17b, and timing difference operating sections 23a and 23b. In addition, the phase difference operating sections 16a and 16b described with respect to previous embodiments can replace the difference current operating sections 15a and 15b. With the seventh embodiment, when it is judged that the simultaneity of the sampling timing between each terminal was lost by the condition judging sections 20a and 20b, the unwanted output from the output sections is prevented. Unless the GPS signal is recovered and a fixed cycle pulse is obtained at this time, from the viewpoint of prevention of an unwanted operation, a safe control of the system to be protected may not occur based just on the lock of the output sections.

With this embodiment, on the assumption that the GPS signal is not recovered, when the transmission delay time of rise and fall lag time is fixed and the transmission rise and fall is in a normal state, it can be treated like a case where the transmission delay rise and fall time is equivalent, by correcting the transmission delay time lag and keeping it fixed. That is, it is possible to take a sampling synchronization using the synchronous system described by explanation of the related art by taking the difference of receiving timing at both terminals receiving timing with the timing differential operating sections 23a and 23b.

Figure 14:
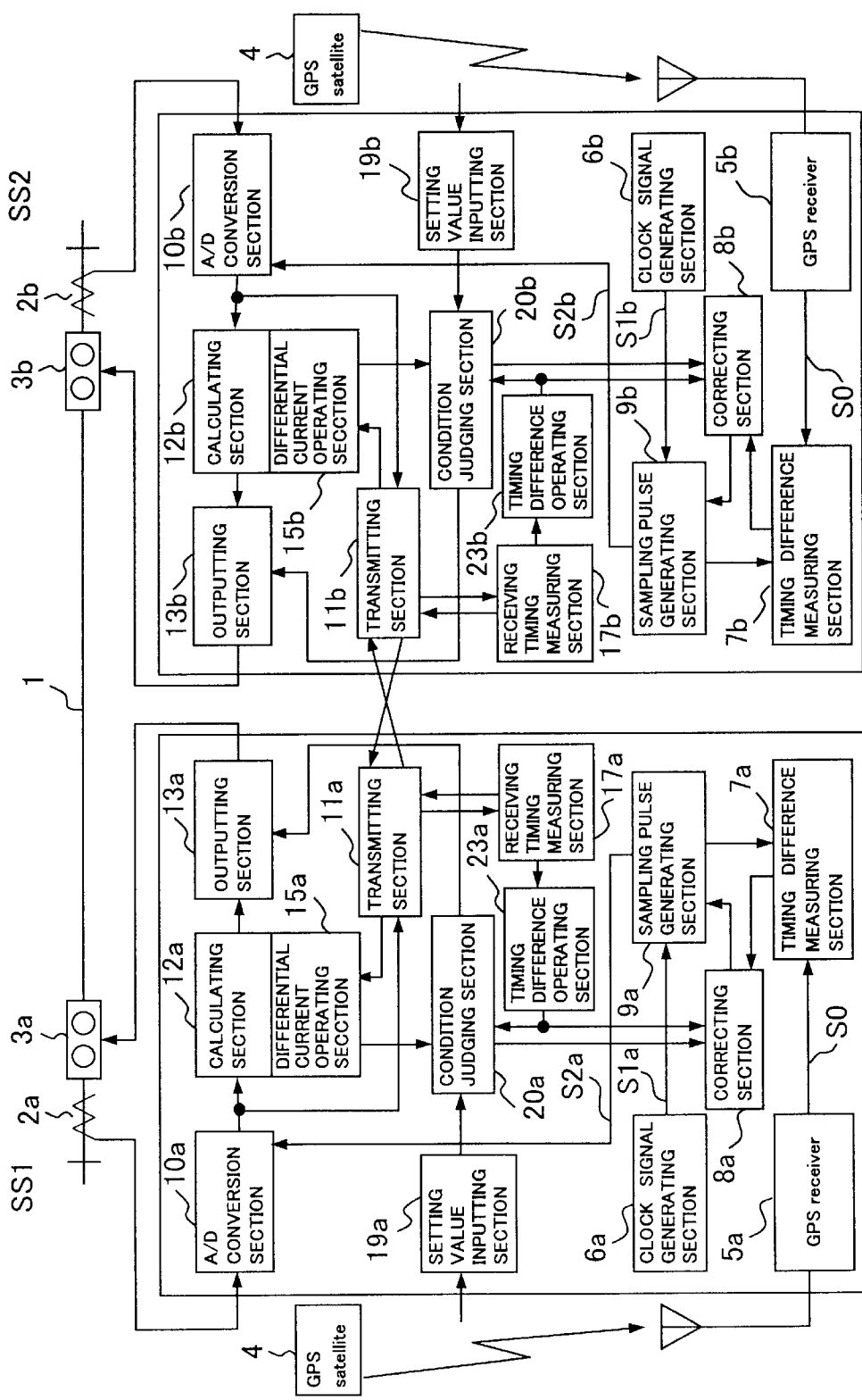
FIG. 14 is a block diagram showing a fourteenth embodiment in accordance with the present invention.

Therefore, a current differential relay can be operated effectively. The lock of output sections 13a can be canceled by condition judging sections 20a of the same terminal 14a by giving a release input to release inputting sections 32a, as shown in FIG. 14, in the transmission path state where a sampling synchronization can be performed using the related art above-mentioned synchronous system. Moreover, the lock of output section 13b can be canceled through the transmitting section 11a and 11b to the condition judgment section 20b of the other terminal (14b).

If the transmission delay rise and fall lag-time of a transmission path is fixed even when GPS signal is lost for a long time according to this embodiment, protection by current differential relay can be performed and the operating rate of the protective relay device can be improved.

(Thirteenth embodiment

FIG. 14 is a block diagram of a thirteenth embodiment in accordance with the present invention.

In FIG. 14, the same elements as shown in FIG. 9 are identified with the same reference numerals as used in FIG. 9, and explanation is omitted for the sake of brevity. The difference between this embodiment and FIG. 9 is the addition of receiving timing measuring sections 17a and 17b and timing difference operating sections 23a and 23b. The phase difference operating sections 16a and 16b described with respect to previous embodiments can replace the differential current operating sections 15a and 15b.

With the twelfth embodiment, once the output sections 13a and 13b are prevented from outputting (e.g. locked), in order to cancel the lock state, it is necessary to give an external input to the release inputting sections 32a and 32b. On the condition that change of the transmission delay time of a transmission path is restricted or ensured, if differential current or phase difference is determined to be within the prescribed limits and the timing differential measuring sections 23a and 23b to the timing difference between equipments is determined to be within the prescribed limits, it is possible to conclude that the sampling synchronization between terminals can be established.

In this case, in response to the result of the differential current operating sections 15a and 15b and the timing difference measuring sections 23a and 23b, the sampling synchronous state between terminals is judged as occurring and the lock of the output sections 13a and 13b is automatically cancelled.

As above mentioned according to this embodiment, even if the state of each terminal changed to a state in which the output sections 13a and 13b are locked, normal operation can be automatically resumed by recovery of a transmission path, and a saving in labor for an operator and improvement in the efficiency of operation can be attained.

(Fourteenth embodiment)

Figure 15:
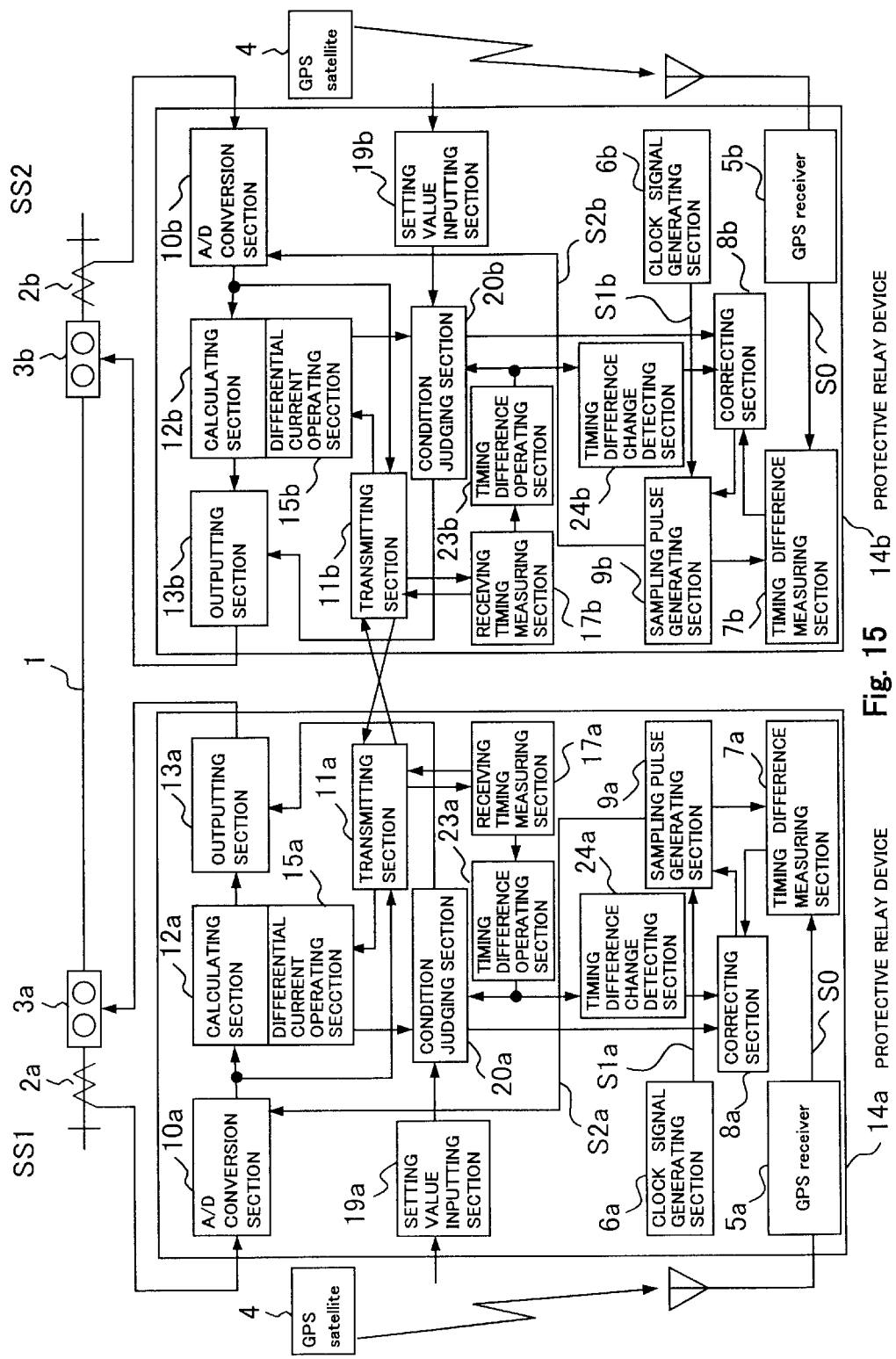
FIG. 15 is a block diagram showing a fifteenth embodiment in accordance with the present invention.

FIG. 15 is a block diagram of a fourteenth embodiment in accordance with the present invention.

In FIG. 15, the same elements as shown in FIG. 14 are identified with the same reference numerals as used in FIG. 14, and explanation is omitted for the sake of brevity. The difference between this embodiment and FIG. 14 is the addition of timing difference sudden change detection sections 24a and 24b. It operates by applying the sampling synchronization using the above-mentioned synchronous method by the timing differential measuring sections 23a and 23b under the state where the GPS signal is absent.

Transmission delay time changes with changes of a transmission path. When the transmission delay rise and fall time becomes not equal to each other, a measurement result to which the sampling synchronous error, which corresponds to half of the difference between rise-transmission delay time and fall-transmission delay time, is obtained as an output from the timing difference measuring sections 23a and 23b.

If correction to a sampling pulse is applied as the measurement result, the corrected quantity will become the sampling synchronous error between terminals. When this state continues for a long time, it is necessary to lock the output sections 13a and 13b. However, in the communications network to which the transmission rise and fall path is switched independently, the case of becoming not equivalent also has the transmission rise and fall delay time of only the time lag corresponding to the time which switches each transmission path from downstream to upstream. For example, the case where the transmission delay rise and fall time is respectively operated in 1 ms is considered below.

It is the case where an upstream transmission path change results in 4 ms of transmission delay time, and a downstream path change after 2 seconds also result in 4 ms of transmission delay time. In this case, during a transmission way change, the transmission delay rise time is set to 4 ms, and the transmission delay fall time is set to 1 ms. That is, in processing of the timing difference measuring sections 23a and 23b, a sampling synchronous error that is the half of the difference of delay time occurs.

An example is shown below.
Difference of delay time: 3 ms
Sampling synchronous error: 1.5 ms {=(4−1)/2}

If a sampling pulse is corrected with the correcting sections 8a and 8b, 1.5 ms of sampling synchronous errors between terminals will generate 1.5 ms of the above-mentioned sampling synchronous errors. Therefore, when the timing difference between terminals changes due to a sudden change of a transmission path by providing the timing differential sudden change detection sections 24a and 24b in FIG. 16, correcting of a sampling pulse is stopped after a fixed time. A threshold that adds the margin to the "error" and "sampling slip" value is prepared. Here, "error" means measurement error that is due to the performance of each device 14a and 14b itself.

Also, when the amount of change of a timing difference becomes larger than the above-mentioned threshold, it is judged as "change of a transmission path." Although the sampling pulse of both terminals is fixed to a normal frequency while this sudden change state is continuing, when the sampling pulse of both terminals is a sufficiently small error with respect to the concerned frequency, it is not necessary to fix a sampling pulse to the normal frequency. On the other hand, after it goes up by the above-mentioned example and a route changes from ordinary route in detail beforehand, it will become with the ordinary route, without requiring any down time and a route changing to an auxiliary route.

In this case, even if a fixed time has passed after the timing difference between terminals changes suddenly, since the transmission delay rise and fall time remain imbalanced, when the measured value of the timing difference between terminals does not return near 0, the output sections 13a and 13b are locked.

As mentioned above, according to this embodiment, operation can be continued, without locking a current differential relay, though the transmission rise and fall delay time does not becomes equivalent, while a GPS signal is lost, by applying the sampling synchronization by the mentioned related method and above-mentioned synchronous system operated temporarily. As a result, improvement in the rate of employment can be achieved.

(Fifteenth embodiment)

Figure 16:
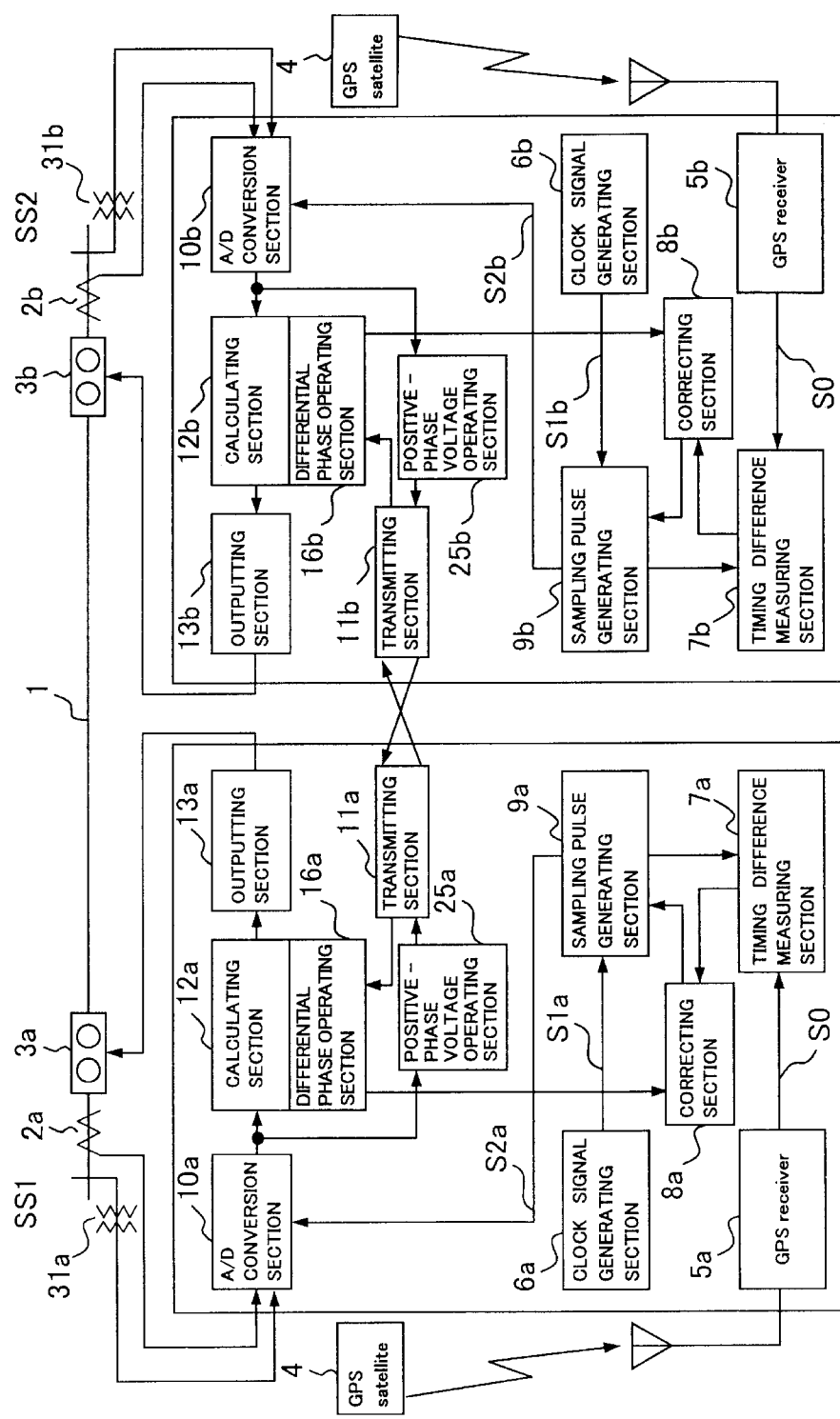
FIG. 16 is a block diagram showing a sixteenth embodiment in accordance with the present invention.

FIG. 16 is a block diagram of a fifteenth embodiment in accordance with the present invention.

In FIG. 16, the same elements as shown in FIG. 6 are identified with the same reference numerals as used in FIG. 16, and explanation is omitted for the sake of brevity. The difference between this embodiment and FIG. 6 is the addition of positive-phase voltage operating sections 25a and 25b.

The positive-phase voltage operating sections 25a and 25b calculate positive-phase voltage from the voltage data obtained from analog/digital conversion sections 10a and 10b. The positive voltage is transmitted and received between terminals through the transmitting sections 11a and 11b. The phase differential operating sections 16a and 16b calculate phase difference based on the positive voltage, which they receive.

As above mentioned, according to this embodiment, when the GPS satellite does not output timing signals, or when the fixed cycle pulse from the above-mentioned GPS receiver is not outputted and when it is difficult for the electric power system to get phase difference due to insufficient current data, the phase difference by voltage data can be obtained. As a result, the sampling pulse which enables synchronization between terminals can be maintained and outputted.

(Sixteenth embodiment)

Figure 17:
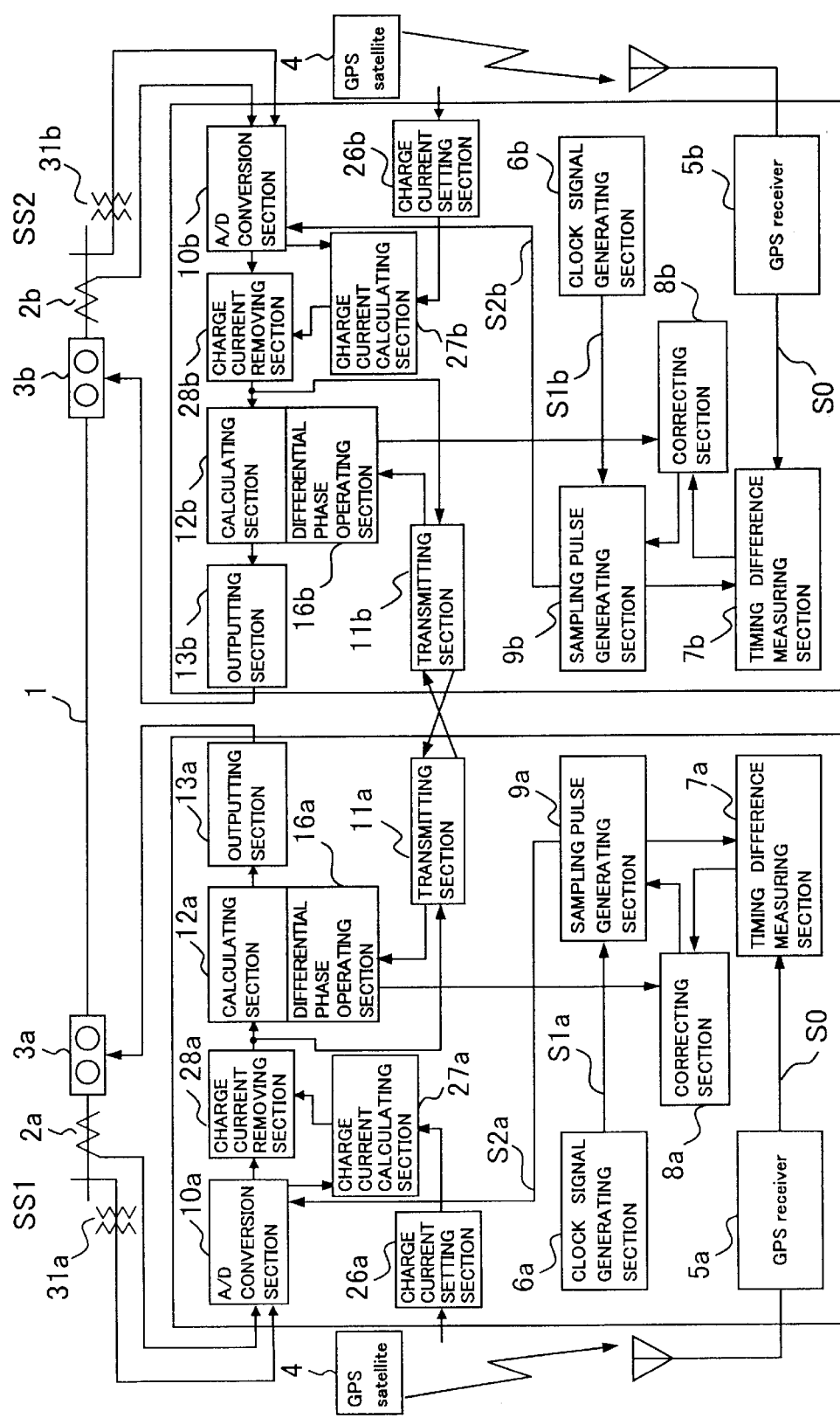
FIG. 17 is a block diagram showing a seventeenth embodiment in accordance with the present invention.

FIG. 17 is a block of a sixteenth embodiment in accordance with the present invention.

In FIG. 17, the same elements as shown in FIG. 6 are identified with the same reference numerals as used in FIG. 6, and explanation is omitted for the sake of brevity. The difference between this embodiment and FIG. 6 is the addition of charge current setting sections 26a and 26b, charge current calculating sections 27a and 27b, and charge current removal sections 28a and 28b. The charging current setting sections 26a and 26b provide and hold from the exterior the amount of charging current Icn, which flows at the time of rated voltage Vn. An electric power system can determine the charge current Ic which actually flows by the following equation, using voltage data V obtained from the analog/digital conversion sections 10a and 10b.

$$Ic=(V/Vn)*Icn$$

The charging current removal sections 28a and 28b remove a charging current ingredient from current data I obtained from the analog/digital conversion sections 10a and 10b based on the charging current Ic inputted. Next, the phase differential operating sections 16a and 16b calculate the phase difference that removes the error by charge current.

As mentioned above, according to this embodiment, when the GPS satellite does not output timing signals and the fixed cycle pulse from the above-mentioned GPS receiver is not outputted, even when charge current is large, the protective system can determine current phase difference, without being influenced by charge current. As a result, the sampling pulse which enables the synchronization between terminals can be maintained and outputted.

(Seventh embodiment)

Figure 18:
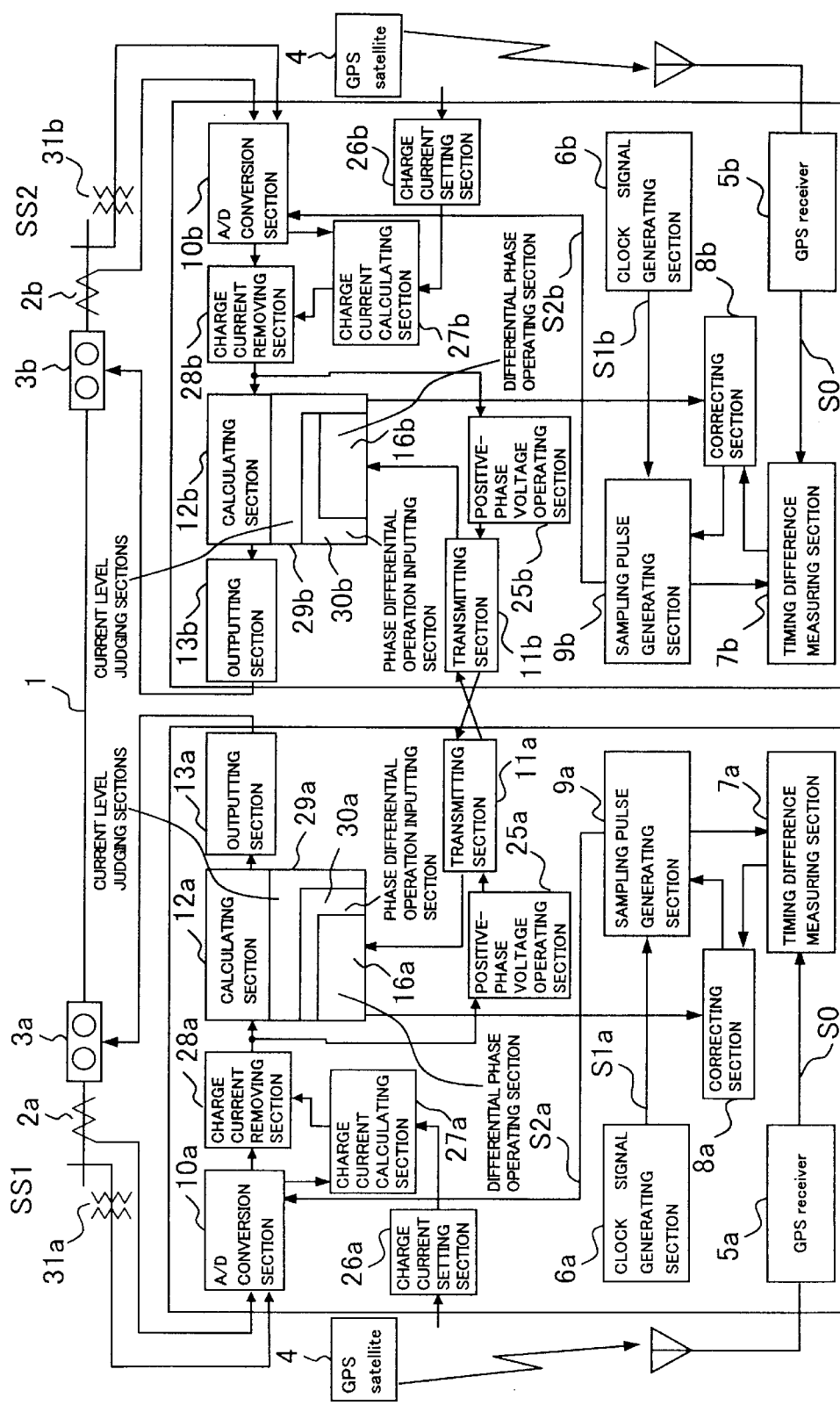
FIG. 18 is a block diagram showing an eighteenth embodiment in accordance with the present invention.

FIG. 18 is a block diagram of a seventh embodiment in accordance with the present invention.

In FIG. 18, the same elements as shown in FIG. 16 are identified with the same reference numerals as used in FIG. 16, and explanation is omitted for the sake of brevity. The difference between this embodiment and FIG. 16 is the addition of current level judging sections 29a and 29b and phase difference operation input change sections 30a and 30b. When voltage data is used for calculation of phase difference, the phases lag by the flowing current, which causes a problem. On the other hand, when current data is used, when there is little power flow, insufficient current data is obtained, thereby creating a problem.

In FIG. 18, the current level judging sections 29a and 29b are provided. That is, when the amplitude of current is small, the phase differential operation input change sections 30a and 30b are controlled to perform phase differential operation using voltage data. Moreover, when the amplitude of current is large, the phase differential operation inputting sections 30a and 30b are controlled to use current data.

In addition, the criterion of amplitude size here is determined by the size of the absolute value of analog data through the A/D conversion.

According to this embodiment, when the GPS satellite does not output timing signals and the fixed cycle pulse from the above-mentioned GPS receiver is not outputted, this embodiment is not concerned with the size of the current, but instead it obtains the phase difference. As a result, the sampling pulse that enables synchronization between terminals can be maintained and outputted. In addition, the embodiment mentioned above rectifies the frequency of the concerned sampling pulse in timing difference measuring sections based on the timing difference of the fixed cycle pulse output from the GPS receiver, and the sampling pulse output from sampling pulse generating sections.

However, it is not limited to the above-mentioned embodiment. That is, as one example, Clock signal S1a and S1b of clock signal generating sections may be used instead of sampling pulse S2a and S2b output from sampling pulse generating sections. In that case, a timing difference is calculated, and the same effect as the above-mentioned embodiment can be acquired even if it corrects the frequency of sampling pulse S2a and S2b based on the timing difference concerned.

The foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims.

The entire contents of Japanese Patent Application 2000-307227, filed Oct. 6, 2000, are incorporated herein by reference.

What is claimed is:

1. A digital protective relay system in an electric power system, having two or more terminals being coupled to form a pair, and protective relay devices provided at each of the terminals, comprising:

receiving sections that respectively are connected to the protective relay device, each receiving section receiving an electric wave from a satellite and outputting a fixed cycle pulse;

clock signal generating sections that respectively are set in each protective relay device, each clock signal generating sections generating a clock signal;

sampling pulse generating sections that respectively are set in each protective relay device, each sampling pulse generating section generating a sampling pulse with a fixed frequency in accordance with the clock signal;

timing difference measurement sections that respectively are set in each protective relay device, each timing difference measurement section measuring a timing difference of the fixed cycle pulse and the sampling pulse;

correcting sections that respectively are set in each protective relay device, each correcting section correct a frequency of the sampling pulse from each sampling pulse generating section in accordance with the timing difference;

digital converting sections that respectively are set in each protective relay device, each digital converting section generating an electrical quantity data in digital form by sampling an electrical quantity of the electric power system in accordance with the sampling pulse of each sampling pulse generating section;

transmitting sections that respectively are set in each protective relay device, each transmitting section transmitting and receiving the electrical quantity data between each protective relay device;

calculating sections that respectively are set in each protective relay device, each calculating section performing a calculation for a protective function by using the electrical quantity data obtained at each protective relay device; and outputting sections that respectively are set in each protective relay device, each outputting section outputting the result of the calculating section at each protective relay device.

2. The digital protective relay system according to claim 1, wherein the two or more terminals are communicatively coupled to each other by way of a transmission line.

3. The digital protective relay system according to claim 1, wherein the electric wave is output by the satellite is a GPS signal.

4. The digital protective relay system according to claim 1, wherein the operating sensitivity operating characteristic of the protective function is made lower when the GPS satellite does not output timing signals, or when the fixed cycle pulse is not output from the GPS receiving sections.

5. The digital protective relay system according to claim 1, further comprising:

differential electrical data operating sections that respectively are connected to the protective relay device, each differential electrical data operating section calculating the differential electrical data at each of the terminals, said correcting sections correcting frequency of each clock signal by said differential electrical data when the GPS satellite does not output timing signals, or when the fixed cycle pulse is not output from the GPS receiving sections.

6. The digital protective relay system according to claim 1, further comprising:

receiving timing measuring sections that respectively are connected to the protective relay device, each receiving timing measuring section measuring a transmission receive time;

transmission delay time operating sections that respectively are connected to the protective relay device, each transmission delay time operating section obtaining the transmission delay time; and correcting sections that respectively are connected to the protective relay device, each correcting sections correcting a timing slip between terminals by said transmission delay time.

7. The digital protective relay system according to claim 5, further comprising:

condition judging sections that respectively are connected to the protective relay device, each condition judging section preventing the result of the calculating section from said outputting section when a predetermined condition is established, said predetermined condition determined by an unwanted operation characteristic.

8. The digital protective relay system according to claim 7, wherein the condition judging sections release the result of the calculating section from said outputting section when the timing difference data is determined to be within the prescribed limits and the electrical data is determined to be within the prescribed limits after preventing the result of the calculating.

9. The digital protective relay system according to claim 7, wherein the correcting sections stop correcting a frequency of the sampling pulse from each sampling pulse generating section in accordance with the timing difference when the transmission delay time change with changes of a transmission path.

10. A digital protective relay system in an electric power system, having two or more terminals being coupled to form a pair, and protective relay devices provided at each of the terminals, comprising:

receiving sections that respectively are connected to the protective relay device, each receiving section receiving an electric wave from a satellite and outputting a fixed cycle pulse;

clock signal generating sections that respectively are set in each protective relay device, each clock signal generating sections generating a clock signal;

sampling pulse generating sections that respectively are set in each protective relay device, each sampling pulse generating section generating a sampling pulse with a fixed frequency in accordance with the clock signal;

timing difference measurement sections that respectively are set in each protective relay device, each timing difference measurement section measuring a timing difference of the fixed cycle pulse and the sampling pulse;

correcting sections that respectively are set in each protective relay device, each correcting section correct a frequency of the sampling pulse from each sampling pulse generating section in accordance with the timing difference, wherein the timing difference is set an approximately zero value in said two or more terminals in order to obtain substantially synchronized sampling of an electrical parameter by said two or more terminals.

* * * * *